(12) United States Patent
Oh et al.

(10) Patent No.: US 12,226,976 B2
(45) Date of Patent: Feb. 18, 2025

(54) MANUFACTURING METHOD OF ALUMINUM-BASED ALLOY PLATED STEEL

(71) Applicant: POSCO CO., LTD, Pohang-si (KR)

(72) Inventors: Jin-Keun Oh, Gwangyang-si (KR);
Il-Ryoung Sohn, Gwangyang-si (KR);
Seong-Woo Kim, Gwangyang-si (KR);
Jeom-Soo Shin, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 0 days.

(21) Appl. No.: 18/406,848

(22) Filed: Jan. 8, 2024

(65) Prior Publication Data
US 2024/0181748 A1 Jun. 6, 2024

Related U.S. Application Data

(62) Division of application No. 18/121,249, filed on Mar. 14, 2023, now Pat. No. 11,904,572, which is a
(Continued)

(30) Foreign Application Priority Data

Dec. 23, 2016 (KR) ........................ 10-2016-0178532

(51) Int. Cl.
| | |
|---|---|
| *B32B 15/01* | (2006.01) |
| *C22C 21/02* | (2006.01) |
| *C22C 38/00* | (2006.01) |
| *C22C 38/02* | (2006.01) |
| *C22C 38/04* | (2006.01) |

(Continued)

(52) U.S. Cl.
CPC ............ *B32B 15/012* (2013.01); *C22C 21/02* (2013.01); *C22C 38/001* (2013.01); *C22C 38/002* (2013.01); *C22C 38/02* (2013.01); *C22C 38/04* (2013.01); *C22C 38/06* (2013.01); *C22C 38/28* (2013.01); *C22C 38/32* (2013.01); *C23C 2/12* (2013.01); *C23C 2/26* (2013.01);
(Continued)

(58) Field of Classification Search
None
See application file for complete search history.

(56) References Cited

U.S. PATENT DOCUMENTS

| | | | |
|---|---|---|---|
| 6,296,805 | B1 | 10/2001 | Laurent et al. |
| 8,307,680 | B2 | 11/2012 | Drillet |

(Continued)

FOREIGN PATENT DOCUMENTS

| | | | |
|---|---|---|---|
| CN | 101591751 A | 12/2009 | |
| CN | 106164317 A | 11/2016 | |

(Continued)

OTHER PUBLICATIONS

U.S. Notice of Allowance dated Aug. 4, 2021 issued in U.S. Appl. No. 16/470,723.
(Continued)

*Primary Examiner* — Daniel J. Schleis
(74) *Attorney, Agent, or Firm* — Morgan, Lewis & Bockius LLP

(57) ABSTRACT

The present disclosure relates to an aluminum-based plated steel that is provided for vehicles by hot forming, an aluminum-based alloy plated steel manufactured using the same, and method of manufacturing thereof.

8 Claims, 2 Drawing Sheets

Related U.S. Application Data division of application No. 17/473,386, filed on Sep. 13, 2021, now Pat. No. 11,654,654, which is a division of application No. 16/470,723, filed as application No. PCT/KR2017/015295 on Dec. 21, 2017, now Pat. No. 11,167,527.

(51) Int. Cl.

| | | |
|---|---|---|
| *C22C 38/06* | (2006.01) | |
| *C22C 38/28* | (2006.01) | |
| *C22C 38/32* | (2006.01) | |
| *C23C 2/12* | (2006.01) | |
| *C23C 2/26* | (2006.01) | |
| *C23C 2/28* | (2006.01) | |
| *C23C 2/40* | (2006.01) | |

(52) U.S. Cl.
CPC ............... *C23C 2/28* (2013.01); *C23C 2/29* (2022.08); *C23C 2/40* (2013.01); *Y10T 428/12757* (2015.01)

(56) References Cited

U.S. PATENT DOCUMENTS

| | | |
|---|---|---|
| 9,963,758 B2 | 5/2018 | Sohn |
| 10,533,237 B2 | 1/2020 | Oh |
| 10,808,292 B2 | 10/2020 | Sohn |
| 11,167,527 B2 * | 11/2021 | Oh ........................ C23C 2/40 |
| 2009/0297387 A1 | 12/2009 | Chin et al. |
| 2011/0165436 A1 | 7/2011 | Drillet et al. |
| 2011/0300407 A1 | 12/2011 | Cho et al. |
| 2016/0362763 A1 | 12/2016 | Oh et al. |
| 2016/0362764 A1 | 12/2016 | Sohn et al. |
| 2016/0376679 A1 | 12/2016 | Kim et al. |

FOREIGN PATENT DOCUMENTS

| | | |
|---|---|---|
| JP | 2000-248349 A | 9/2000 |
| KR | 10-2004-0007718 A | 1/2004 |
| KR | 10-2009-0086970 A | 8/2009 |
| KR | 10-2010-0082537 A | 7/2010 |
| KR | 10-1569505 B1 | 11/2015 |
| KR | 10-1569508 B1 | 11/2015 |
| KR | 10-1569509 B1 | 11/2015 |
| KR | 10-2016-0077583 A | 7/2016 |
| WO | 2002/103073 A2 | 12/2002 |

OTHER PUBLICATIONS

Chinese Office Action—Chinese Patent Application No. 201780080295.X issued on Jul. 27, 2020.
European Search Report—European Patent Application No. 17882319.1, issued on Sep. 4, 2019.
International Search Report dated Apr. 4, 2018 issued in International Patent Application No. PCT/KR2017/015295 (with English translation).
U.S. Notice of Allowance dated Feb. 6, 2023 issued in U.S. Appl. No. 17/473,386.
U.S. Non-Final Office Action dated Oct. 14, 2022 issued in U.S. Appl. No. 17/473,386.
U.S. Notice of Allowance dated Oct. 16, 2023 issued in U.S. Appl. No. 18/121,249.
U.S. Non-Final Office Action dated Jun. 23, 2023 issued in U.S. Appl. No. 18/121,249.

* cited by examiner

MANUFACTURING METHOD OF ALUMINUM-BASED ALLOY PLATED STEEL

The present application is a divisional of U.S. patent application Ser. No. 18/121,249, filed on Mar. 14, 2023, which is a divisional of U.S. patent application Ser. No. 17/473,386, filed on Sep. 13, 2021, now U.S. Pat. No. 11,654,654, issued on May 23, 2023, which is a divisional of U.S. patent application Ser. No. 16/470,723, filed on Jun. 18, 2019, now U.S. Pat. No. 11,167,527, issued on Nov. 9, 2021, which is a 371 Application of International Patent Application No. PCT/KR2017/015295, filed on Dec. 21, 2017, which claims benefit of priority to Korean Patent Application No. 10-2016-0178532 filed on Dec. 23, 2016, disclosures relate to an aluminum-based plated steel that is provided for vehicles by hot forming, an aluminum-based alloy plated steel manufactured using the same, and method of manufacturing thereof.

TECHNICAL FIELD

Background Art

Recently, in the manufacturing of vehicle components requiring corrosion resistance and crashworthiness, such as vehicle structural members, reinforcing members, and the like, a hot forming (or referred to as "hot press forming") technique has been increasingly used.

The hot press forming technique has been known as an excellent technique for securing ultra-high strength for reducing a weight of a vehicle and improving crashworthiness which have been required of automobile companies. The hot press forming technique may resolve the problems related to formability, shape fixability, and the like, during a cold press forming, caused by ultra-high strength of steel.

Also, patents and techniques relating to an aluminum plated or hot-dip galvanized steel have been developed to secure corrosion resistance of a vehicle component. Reference 1 discloses a technique relating to a method of manufacturing an aluminum plated steel for hot press forming.

In Reference 1, steel for hot press forming (HPF) may have low strength before a heat treatment. A high temperature heating may be performed in the HPF process, and a rapid cooling process may be performed by cooing a mold, thereby manufacturing a hot press formed component having martensite as a main phase in a final component. Also, an Fe—Al intermetallic compound may be formed in a plating layer during a heat treatment such that heat resistance and corrosion resistance may be secured.

When an Al-plated steel is heated to approximately 900° C. in a heating furnace, various intermetallic compounds such as FeAl, Fe2Al5, and the like, may be formed in an Al-plated layer, and an alloy layer may be formed. Such intermetallic compounds may have high brittleness, such that the intermetallic compounds may be separated from a plating layer during a press forming process and may be adhered to a press surface. Accordingly, it may be difficult to perform a continuous press forming process, which may be disadvantageous, and there may be a problem of degradation of corrosion resistance.

Thus, there has been increasing demand for a steel for hot press forming which may secure excellent corrosion resistance even after hot press forming, and a hot press formed member using the same.

PRIOR ART (Reference 1) U.S. Pat. No. 6,296,805

DISCLOSURE

Technical Problem

An aspect of the present disclosure is to provide an aluminum-based plated steel having improved corrosion resistance before and after hot press forming, an aluminum-based alloy plated steel material using the same, and a method of manufacturing the aluminum-based plated steel material and the aluminum-based alloy plated steel material.

However, aspects of the present disclosure are not limited thereto. Additional aspects will be set forth in part in the description which follows, and will be apparent from the description to those of ordinary skill in the related art.

Technical Solution

According to an aspect of the present disclosure, an aluminum-based plated steel having excellent corrosion resistance is provided, the aluminum-based plated steel including base steel comprising, by wt %, 0.18 to 0.25% of C, 0.1 to 0.5% of Si, 0.9 to 1.5% of Mn, 0.03% or less of P, 0.01% or less of S, 0.01 to 0.05% of Al, 0.01 to 0.5% of Cr, 0.01 to 0.05% of Ti, 0.001 to 0.005% of B, 0.009% or less of N, and a balance of Fe and inevitable impurities, and the aluminum-based plated steel further comprises an Al-based plated layer formed on a surface of the base steel, the Al-based plated layer comprises an Al—Si crystallized phase, and an average gain size of the Al—Si crystallized phase is 4 μm or less.

According to another aspect of the present disclosure, a method of manufacturing an aluminum-based plated steel having excellent corrosion resistance is provided, the method including preparing a base steel comprising, by wt %, 0.018 to 0.25% of C, 0.1 to 0.5% of Si, 0.9 to 1.5% of Mn, 0.03% or less of P, 0.01% or less of S, 0.01 to 0.05% of Al, 0.05 to 0.5% of Cr, 0.01 to 0.05% of Ti, 0.001 to 0.005% of B, 0.009% or less of N, and a balance of Fe and inevitable impurities; plating the prepared base steel by submerging the base steel in a hot-dip aluminum plating bath; and cooling the plated base steel at 3 to 25° C./s.

According to another aspect of the present disclosure, an aluminum-based alloy plated steel having excellent corrosion resistance is provided, the aluminum-based alloy plated steel including base steel comprising, by wt %, 0.018 to 0.25% of C, 0.1 to 0.5% of Si, 0.9 to 1.5% of Mn, 0.03% or less of P, 0.01% or less of S, 0.01 to 0.05% of Al, 0.05 to 0.5% of Cr, 0.01 to 0.05% of Ti, 0.001 to 0.005% of B, 0.009% or less of N, and a balance of Fe and inevitable impurities, and the aluminum-based alloy plated steel further comprises an Fe—Al alloy plated layer formed by a heat treatment, and the Fe—Al alloy plated layer comprises a middle layer concentrated with Si, and an average grain size of the middle layer is 2 μm or less.

According to another aspect of the present disclosure, a method of manufacturing an aluminum-based alloy plated steel having excellent corrosion resistance is provided, the method including preparing a base steel comprising, by wt %, 0.018 to 0.25% of C, 0.1 to 0.5% of Si, 0.9 to 1.5% of Mn, 0.03% or less of P, 0.01% or less of S, 0.01 to 0.05% of Al, 0.05 to 0.5% of Cr, 0.01 to 0.05% of Ti, 0.001 to 0.005% of B, 0.009% or less of N, and a balance of Fe and inevitable impurities; plating the prepared base steel by submerging the base steel in a hot-dip aluminum plating bath; cooling the plated based steel at 3 to 25° C./s and manufacturing an aluminum-based plated steel having an Al-based plated layer; heating the aluminum-based plated steel at 800 to 1000° C. for 3 to 20 minutes, where a change of the heating rate at a temperature range of 600 to 700° C. is 0.05° C./s$^2$ or less in absolute value; and rapidly cooling the heated aluminum-based plated steel.

Advantageous Effects

According to an aspect of the present disclosure, an aluminum-based plated steel having excellent corrosion resistance and also an aluminum-based alloy plated steel having ultra-high strength of 1300 MPa or higher and having improved corrosion resistance after hot press forming may be provided, and an appropriate method of manufacturing the above-described steel may be provided, which are technical effects of the present disclosure.

BEST MODE FOR INVENTION

Figure 1:
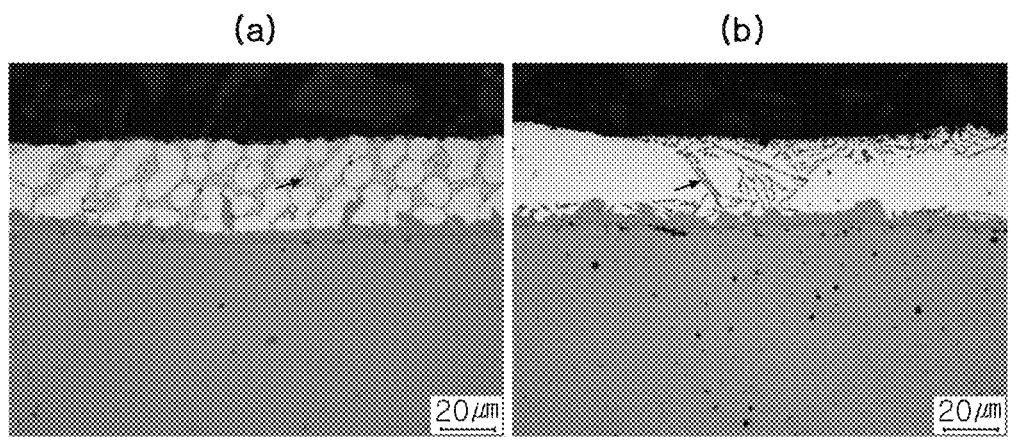
FIG. 1 is an image obtained by observing plating layers of inventive material A and comparative material C among embodiments of the present disclosure.

Hereinafter, preferable example embodiments of the present disclosure will be described in detail.

The inventors have been found that, when a hot press forming process is performed using a steel used for hot press forming, properties of a plating layer, particularly an aluminum or aluminum alloy plated layer (hereinafter, referred to as "aluminum-based plated layer" or "Al-based plated layer"), before a heat treatment, may greatly affect corrosion resistance. They also have found that, property of an alloyed plated layer (hereinafter, referred to as "aluminum-based alloy plated layer") after a hot press forming heat treatment may be important with respect to improvement of corrosion resistance of a hot press formed member.

Accordingly, to improve corrosion resistance, the inventors conducted researches on a plating layer of the aluminum-based plated steel and an alloy plated layer of an aluminum-based alloy plated steel, alloyed after a hot press forming heat treatment, and reached to the present disclosure.

An aluminum-based plated steel will be described in detail.

The aluminum-based plated steel may include base steel and an Al-based plated layer formed on a surface of the base steel.

The base steel may include, by wt %, 0.18 to 0.25% of C, 0.1 to 0.5% of Si, 0.9 to 1.5% of Mn, 0.03% or less of P, 0.01% or less of S, 0.01 to 0.05% of Al, 0.05 to 0.5% of Cr, 0.01 to 0.05% of Ti, 0.001 to 0.005% of B, 0.009% or less of N, and a balance of Fe and inevitable impurities. In the description below, a compositional range of the base steel will be described in detail (hereinafter, wt %).

Carbon (C): 0.18 to 0.25%

C is an essential element which may improve strength of martensite. When a content of C is less than 0.18%, it may be difficult to obtain sufficient strength for securing crashworthiness. When a content of C exceeds 0.25%, impact toughness of a slab may degrade, and weldability of an HPF formed member may degrade. Thus, in the present disclosure, it may be preferable to control a content of C to be 0.18 to 0.25%.

Silicon (Si): 0.1 to 0.5%

Si may be added for deoxidation of steel, and may be effective for homogenization of a structure of a member after an HPF process. When a content of Si is less than 0.1%, an effect of deoxidation and structure homogenization may not be sufficiently obtained. When a content of Si exceeds 0.5%, it may be difficult to secure good quality of a hot-dip aluminum plated surface due to a Si oxide formed on a surface of a steel sheet during annealing. Thus, it may be preferable to control a content of Si to be 0.5% or less.

Mn: 0.9 to 1.5%

Mn may be added to secure hardenability of steel similarly to Cr, B, and the like. When a content of Mn is less than 0.9%, it may be difficult to secure sufficient hardenability such that bainite may be formed, and it may be difficult to secure sufficient strength. Also, when a content of Mn exceeds 1.5%, costs for manufacturing a steel sheet may increase, and Mn may be segregated in a steel material such that bendability of an HPF formed member may significantly degrade. Thus, in the present disclosure, it may be preferable to control a content of Mn to be 0.9 to 1.5%.

P: 0.03% or less (excluding 0%)

P is a grain boundary segregation element which may degrade various properties of a hot press formed member. Thus, it may be preferable to add as a low a content of P as possible. When a content of P exceeds 0.03%, bendability of a formed member, impact properties, weldability, and the like, may degrade. Thus, it may be preferable to control an upper limit content of P to be 0.03%.

S: 0.01% or less (excluding 0%)

S is an element which may be present in steel as an impurity, and may degrade the bendability and weldability of a formed member. Thus, it may be preferable to add as low a content of P as possible. When a content of S exceeds 0.01%, bendability and weldability of a formed member may degrade. Thus, it may be preferable to control an upper limit content of S to be 0.01%.

Al: 0.01 to 0.05%

Al may be added for the purpose of deoxidation in the steel making similarly to Si. To achieve the purpose, 0.01% or higher of Al may need to be added. When a content of Al exceeds 0.05%, the effect of addition of Al may be saturated, and surface quality of a plated material may be deteriorated. Thus, it may be preferable to control an upper limit content of Al to be 0.05%.

Cr: 0.01 to 0.5%

Cr may be added to secure hardenability of steel similarly to Mn, B, and the like. When a content of Cr is less than 0.01%, it may be difficult to secure sufficient hardenability. When a content of Cr exceeds 0.5%, hardenability may be sufficiently secured, but properties thereof may be saturated, and costs for manufacturing steel may increase. Thus, in the present invention, it may be preferable to control a content of Cr to be 0.01 to 0.5%.

Ti: 0.01 to 0.05%

Ti may create TiN by being combined with nitrogen remaining as impurities in steel, and may thus be added to cause solid solution B to remain, solid solution B which may be essential for securing hardenability. When a content of Ti is less than 0.01%, it may be difficult to obtain the effect of addition of Ti. When a content of Ti exceeds 0.05%, the properties thereof may be saturated, and costs for manufacturing steel may increase. Thus, in the present disclosure, it may be preferable to control a content of Ti to be 0.01 to 0.05%.

B: 0.001 to 0.005%

B may be added to secure hardenability in a hot press formed member similarly to Mn and Cr. To achieve the purpose described above, 0.001% or higher of B may need to be added. When a content of B exceeds 0.005%, the effect of the addition of B may be saturated, and hot press forming properties may significantly degrade. Thus, in the present disclosure, it may be preferable to control a content of B to be 0.001 to 0.005%.

N: 0.009% or less

M may be present as an impurity in steel, and it may be preferable to as low a content of N as possible. When a content of N exceeds 0.009%, a surface defect may occur in steel. Thus, it may be preferable to control an upper limit content of N to be 0.009%.

As a remainder, Fe and inevitable impurities may be included. However, addition of other alloy elements may not be excluded without departing from the technical idea of the present disclosure. To obtain a more preferable effect, elements as below may be additionally included.

One or more of molybdenum (Mo) and tungsten (W): 0.001 to 0.5%

Mo and W are elements which may improve hardenability and may strengthen precipitation, and may be effective for securing high strength. When a content of Mo and W is less than 0.001%, the effect of securing sufficient hardenability and strengthened precipitation may not be obtained. When a content Mo and W exceeds 0.5%, the effect of addition of Mo and W may be saturated, and manufacturing costs may increase. Thus, in the present disclosure, it may be preferable to control a content of Mo and W to be 0.001 to 0.5%.

A combination of one or more of niobium (Nb), zirconium (Zr), or vanadium (V): 0.001 to 0.4%

Nb, Zr, and V are elements which may increase strength of a steel sheet, may refine grains and may improve heat treatment properties. When a content of one or more of Nb, Zr, and V is less than 0.001%, it may be difficult to obtain the above-described effect. When the content exceeds 0.4%, manufacturing costs may significantly increase. Thus, in the present disclosure, a content of the elements may be controlled to be 0.001 to 0.4%.

One or more of copper (Cu) and nickel (Ni): 0.005 to 2.0%

Cu is an element which may improve strength by forming fine Cu precipitation, and Ni is an element which may be effective for improving strength and heat treatment properties. When a content of the elements is less than 0.005%, sufficient strength may not be obtained. When the content exceeds 2.0%, workability may be deteriorated, and manufacturing costs may increase. Thus, in the present disclosure, a preferable content of Cu and Ni may be 0.005 to 2.0%.

One or more of antimony (Sb), tin (Sn), or bismuth (Bi): 0.03% or less.

Sb, Sn, and Bi are grain boundary segregation elements which may be concentrated on an interfacial surface between a plating layer and base iron during an HPF heating process such that adhesive properties of the plating layer may improve. By improving adhesive properties of the plating layer, the element may prevent the plating layer from being separated during a hot press forming. As Sb, Sn, and Bi may have similar characteristics, the three elements may be mixed and the mixture may be used, and in this case, it may be preferable to control the combination of one or more of the elements to be 0.03%. When the combination of the elements exceeds 0.03%, brittleness of base steel may be deteriorated during a hot press forming process.

In the aluminum-based plated steel, an Al-based plated layer may be formed on a surface of the base steel. The Al-based plated layer may include an Al—Si crystallized phase.

The Al—Si crystallized phase may refer to a phase formed by crystallization in a liquid state in the Al-based plating layer. As an example, FIG. 1 is an image of an Al—Si crystallized phase (an arrow in FIG. 1), and the Al—Si crystallized phase may have a spherical shape or a needle shape depending on the form of the phase.

A preferable size (an average equivalent circular grain size) of the Al—Si crystallized phase may be 4 μm or less. Also, a preferable aspect ratio of the Al—Si crystallized phase may be 10 or less. A preferable content of Si in the Al—Si crystallized phase may be 3 to 25 wt %. A size, an aspect ratio, and a content of Si of the Al—Si crystallized phase may be factors which may affect t the complete remelting of the Al—Si crystallized phase during a subsequent hot press forming process. Also, when Si of the crystallized phase is fully solute in an Fe—Al middle layer formed in an Fe—Al alloy plated layer of the aluminum-based alloy plated steel, grain growth of the middle layer may be prevented consequently. Also, the finer the grain size (preferably, 2 μm or less), propagation of cracks which may be inevitably created during a hot press forming process may further be prevented in the middle layer such that corrosion resistance may improve.

When a size (an average equivalent circular grain size) of the Al—Si crystallized phase exceeds 4 μm, it may be difficult for the crystallized phase to be remelted during a hot press forming process. Even through a size of the Al—Si crystallized phase is 4 μm or less, when an aspect ratio exceeds 10, it may be difficult for the crystallized phase to be completely remelted in a long shaft direction such that there may be a limitation in obtaining the above-described effect. When a content of Si in the crystallized phase is less than 3 wt %, it may be difficult to prevent the grain growth of the middle layer. When the content of Si exceeds 25 wt %, excessive content of Si may need to be added to a plating bath, which may significantly increase a melting point of the plating bath such that plating workability may be deteriorated.

A preferable thickness of the Al-based plated layer may be 15 to 35 μm. When a thickness of the Al-based plated layer is less than 15 μm, it may be difficult to secure sufficient corrosion resistance in the aluminum-based alloy plated steel. When the thickness exceeds 35 μm, a thickness of the plating layer in the final aluminum-based alloy plated steel may excessively grow such that workability may be deteriorated.

In the description below, a method of manufacturing an aluminum-based plated steel of the present disclosure will be described.

In the present disclosure, base steel having the above-described composition may be prepared, and it may be preferable to manufacture the aluminum-based plated steel by performing a hot-dip aluminum plating process.

The base steel may be a hot-rolled steel sheet, a cold-rolled steel sheet, an annealed steel sheet, and the like, and a type of the base steel may not be particularly limited. Any steel material which may be able to be applied in the technical field of the present disclosure may be used.

In the hot-dip aluminum plating process, the base steel may be submerged in a hot-dip plating bath, an amount of plating to be attached may be adjusted using an air knife, a cooling rate may be adjusted, and a size and an aspect ratio of the Al—Si crystallized phase in the Al-based plated layer may be adjusted.

A preferable cooling rate after the plating may be 3 to 25° C./s. When the cooling rate is less than 3° C./s, the Al—Si crystallized phase may become excessively coarse, and the solidification on a top roll may be incomplete such that quality of plating surface may be deteriorated. When the cooling rate exceeds 25° C./s, the Al—Si crystallized phase may be distributed in a fine and uniform manner, but costs may increase due to excessive investment to cooling facility.

A preferable composition of the hot-dip aluminum plating bath may include, by wt %, 8 to 11% of Si, 3% or less of Fe, and a balance of Al and inevitable impurities.

In the description below, an aluminum-based alloy plated steel will be described in detail.

The aluminum-based alloy plated steel may include a Fe—Al alloy plated layer obtained by alloying the Al-based plated layer with an element such as Fe in the base steel on a surface of the base steel having the above-described composition. The Fe—Al alloy plated layer may include a middle layer concentrated with Si.

Figure 2:
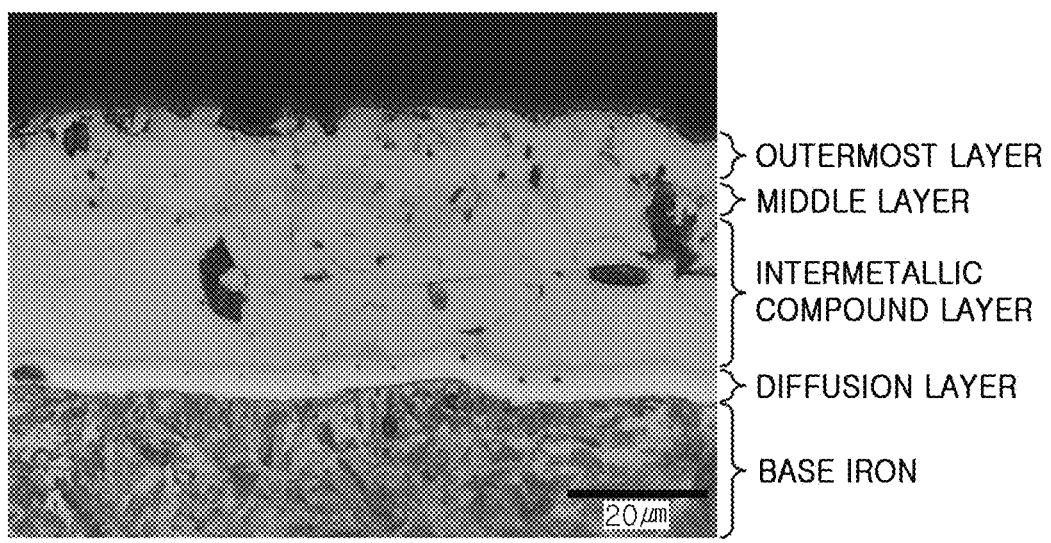
FIG. 2 is an image obtained by observing a cross-sectional surface of an Fe—Al alloy plated layer of embodiment A-1 among embodiments of the present disclosure.

As illustrated in FIG. 2, the aluminum-based alloy plated steel may include a diffusion layer, an intermetallic compound layer, a middle layer, an outermost layer, and the like, from the base steel. The middle layer may refer to a layer concentrated with and comprising Si and continuously or discontinuously formed.

The middle layer may occupy 5 to 30% based on a thickness of a cross-sectional surface of the Fe—Al alloy plated layer. When a thickness of the middle layer occupies less than 5% based on a thickness of a cross-sectional surface of the Fe—Al alloy plated layer, it may be insufficient to prevent propagation of cracks in a plating layer. When the thickness exceeds 30%, a heat treatment may need to be excessively performed on a steel blank at a significantly high temperature and for a long period of time, which may degrade productivity.

A preferable size of the middle layer may be 2 µm or less. The middle layer may prevent propagation of cracks, and to this ends, grains may need to be fine. When a grain size of the middle layer exceeds 2 µm, it may be difficult to secure the sufficient effect of preventing propagation of cracks.

A preferable content of Si of the middle layer may be 7 to 14 wt %. Si of the middle layer may stabilize a phase of the middle layer and may also be important for preventing grain growth. Thus, when a content of Si is less than 7 wt %, it may be difficult to obtain the above-described effect, and to include Si of higher than 14%, an excessive content of Si may need to be added in a plating bath, a heat treatment may need to be performed on a blank at a significantly high temperature for a long period of time, a diffusion layer may become excessively thick (exceeding 16 µm) such that weldability may degrade.

The base steel of the aluminum-based alloy plated steel of the present disclosure may include a martensite structure of 95% or higher preferably, and a preferable tensile strength may be 1300 MPa or higher.

In the description below, a method of manufacturing an aluminum-based alloy plated steel will be described in detail.

The aluminum-based alloy plated steel may be manufactured by hot-press heating the above-described aluminum-based plated steel and cooling the heated aluminum-based plated steel, and a forming process may be performed after the heating.

The aluminum-based plated steel may be prepared, and a heat treatment in which the aluminum-based plated steel is heated at 800 to 1000° C. for 3 to 20 minutes may be performed.

When the heating temperature is less than 800° C., sufficient austenite may not be obtained such that it may be difficult to secure sufficient strength even when a rapid cooling is performed. When the heating temperature exceeds 1000° C., heating costs may be excessive, and heating facility may be deteriorated when the facility is used for a long time. When the heating time is less than 3 minutes, homogenization of an alloy element such as carbon and manganese in the base steel may be difficult. When the heating time exceeds 20 minutes, a thickness of the diffusion layer may excessively increase such that weldability may degrade.

A preferable heating rate during the heat treatment may be 1 to 10° C./s. When the heating rate is less than 1° C./s, it may be difficult to secure productivity of the aluminum-based alloy plated steel material. When the heating rate exceeds 10° C./s, it may be difficult for the Al—Si crystallized phase to be fully remelted in the plating layer, and excessive costs may be required to increase the heating rate, which may not be preferable.

A preferable change of the heating rate at a temperature range of 600 to 700° C. during the heating may be 0.05° C./s2 or less in absolute value. In the temperature range of 600 to 700° C. during the heating, the Al plating may be performed and the Al—Si crystallized phase may be remelted. When a change of the heating rate exceeds 0.05° C./s2, the Al—Si crystallized phase may not be stably and smoothly redistributed on the middle layer of the plating layer, and accordingly, it may be difficult to secure a desired grain size, a desired content of Si, a desired thickness of the middle layer.

The steel heated as above may be rapidly cooled in a mold. The steel may be cooled to 300° C. or lower, and a preferable cooling rate during the cooling may be 20 to 200° C./s. When the cooling rate is less than 20° C./s, a cooling effect may not be obtained. When the cooling rate exceeds 200° C./s, an effect of martensite transformation by hot press forming may decrease due to excessive cooling.

Mode for Invention

In the description below, an example embodiment of the present disclosure will be described in greater detail. It should be noted that the exemplary embodiments are provided to describe the present disclosure in greater detail, and to not limit the present disclosure.

Embodiment 1

A cold-rolled steel sheet having a composition (wt %, and a remainder was Fe and inevitable impurities) as in Table 1 was prepared, and a plating process was performed under Al plating conditions indicated in Table 2.

A size of an Al—Si crystallized phase, a content of Si of the Al—Si crystallized phase, and an aspect ratio of the Al—Si crystallized phase of the plating layer of the aluminum-based plated steel manufactured as above were observed, and the results were indicated in Table 3. Also, corrosion resistance of the Al plated steel was examined, and the result was indicated in Table 3 as well.

A size, an aspect ratio, and a content of Si of the Al—Si crystallized phase on the plating layer were obtained by observing three regions of a cross-sectional surface of the plating layer using a scanning electron microscope (SEM), and by carrying out an image analysis and by using an EDS, and the averages were listed in the table.

TABLE 1

| C | Si | Mn | P | S | Al | Cr | Ti | B | N |
|---|---|---|---|---|---|---|---|---|---|
| 0.21 | 0.25 | 1.2 | 0.013 | 0.003 | 0.02 | 0.15 | 0.03 | 0.0023 | 0.0035 |

TABLE 2

| Classification | Composition of Al-based Plating Bath (wt %, a remainder of Al) | | Amount of Attached Plating (g/m$^2$) | Cooling Rate after Solidification (° C./s) | Note |
|---|---|---|---|---|---|
| | Si | Fe | | | |
| Condition 1 | 8.3 | 2.1 | 75 | 8.9 | Inventive Material A |
| Condition 2 | 8.7 | 1.9 | 82 | 4.5 | Inventive Material B |
| Condition 3 | 7.4 | 2.0 | 78 | 1.8 | Comparative Material C |
| Condition 4 | 5.2 | 1.8 | 62 | 31.2 | Comparative Material D |

TABLE 3

| Classification | Size of Al—Si Crystallized Phase (μm) | Content of Si of Al—Si Crystallized Phase (wt. %) | Aspect Ratio of Al—Si Crystallized Phase |
|---|---|---|---|
| Inventive Material A | 2.0 | 11.5 | 3.8 |
| Inventive Material B | 1.4 | 6.0 | 3.0 |
| Comparative Material C | 6.0 | 18.2 | 15.6 |
| Comparative Material D | 0.9 | 2.7 | 2.8 |

As indicated in Table 3, a size, a content of Si, and an aspect ratio of the Al—Si crystallized phase of the inventive material were included in the range of the present disclosure, whereas the comparative material did not satisfy the range of the present disclosure.

Particularly, (a) and (b) of FIG. 1 are images obtained by observing plating layers of inventive material A and comparative material C, respectively. In inventive material A, the Al—Si crystallized phase was formed, whereas in comparative material C, a very sharp crystallized phase was formed.

Embodiment 2

The aluminum-based plated steel material manufactured through Embodiment 1 above was prepared, and a heat treatment was performed under conditions indicated in Table 4 below.

After performing the heat treatment, an alloy layer formed on a surface of a manufactured aluminum-based alloy plated steel was analyzed, and the result was listed in Table 5. Specifically, a grain size and a content of Si of a middle layer formed in the alloy layer were measured, and the results were listed in Table 5.

As for a corrosion resistance test, a phosphate process and a painting process were performed on the member sample under a GMW14872 method, and a maximum blister width was measured after 53 cycles for an X-cut sample under a CCT condition.

A thickness of the middle layer was obtained by calculating a ratio of a thickness of the middle layer to a thickness of an overall Fe—Al alloy plated layer using an optical microscope. A content of Si and a size of the middle layer were obtained by processing a cross-sectional surface using a focused ion beam (FIB), and by analyzing a grain size and a composition using a transmission electron microscope (TEM).

TABLE 4

| Al-based Steel Material | Heating Temperature (° C.) | Heating Time (minutes) | Heating Rate (° C./s) | Change of Heating Rate (° C./s$^2$) | Classification |
|---|---|---|---|---|---|
| Inventive Material A | 900 | 6 | 2.8 | −0.01 | Inventive Example A-1 |
| Inventive Material A | 900 | 6 | 2.3 | −0.07 | Comparative Example A-2 |
| Inventive Material A | 900 | 6 | 0.5 | −0.002 | Comparative Example A-3 |
| Inventive Material A | 900 | 6 | 15.2 | −0.004 | Comparative Example A-4 |
| Inventive Material B | 950 | 4 | 3.5 | −0.02 | Inventive Example B-1 |
| Inventive Material B | 760 | 10 | 2.1 | −0.008 | Comparative Example B-2 |
| Inventive Material B | 950 | 30 | 4.6 | −0.007 | Comparative Example B-3 |
| Comparative Material C | 930 | 6 | 4.1 | −0.01 | Comparative Example C-1 |
| Comparative Material D | 930 | 6 | 3.8 | −0.013 | Comparative Example D-1 |

TABLE 5

| Classification | Grain Size of Middle Layer (μm) | Content of Si of Middle Layer (wt. %) | Ratio of Thickness of Middle Layer (%) | Corrosion Resistance Test (blister width, mm) | Tensile Strength (MPa) |
|---|---|---|---|---|---|
| Inventive Example A-1 | 0.9 | 8.8 | 10.4 | 0.5 | 1506 |
| Comparative Example A-2 | 2.3 | 5.8 | 8.3 | 1.5 | 1487 |
| Comparative Example A-3 | 0.7 | 10.5 | 14.6 | 0.5 | 1527 |
| Comparative Example A-4 | 2.1 | 6.2 | 4.8 | 1.5 | 1498 |
| Inventive Example B-1 | 0.8 | 8.7 | 12.5 | 0.5 | 1513 |
| Comparative Example B-2 | 0.4 | 7.9 | 3.2 | 2.0 | 1051 |
| Comparative Example B-3 | 1.7 | 11.6 | 21.4 | 0.5 | 1473 |
| Comparative Example C-1 | 3.5 | 5.4 | 11.8 | 2.5 | 1537 |
| Comparative Example D-1 | 4.1 | 4.2 | 13.8 | 2.5 | 1516 |

As indicated in the results in Table 5 above, both of inventive examples A-1 and B-1 satisfying the conditions of the present disclosure had excellent corrosion resistance, and secured high strength. Comparative example A-2 was the case in which a change value of a temperature rising speed of the present disclosure was not satisfied, and a grain size of the middle layer was coarse, and corrosion resistance degraded.

In comparative example A-3, as a temperature rising speed was too low to secure high productivity, and was thus be classified as a comparative example. In comparative example A-4, as a temperature rising speed was too fast such that a grain size of the middle layer was coarse, and corrosion resistance degraded.

In comparative example B-2, as a heat treatment temperature was low, sufficient strength was not secured. In comparative example B-3, a heat treatment was performed for a long time, and accordingly, productivity was low, and weldability was able to be deteriorated, and thus, comparative example B-3 was classified as a comparative example.

In comparative examples C-1 and C-2, a hot press forming heat treatment process satisfied the range of the present disclosure, but an Al plated steel material which did not satisfied the range of the present disclosure was used. Accordingly, a grain size of the middle layer was coarse, and corrosion resistance degraded.

Figure 3:
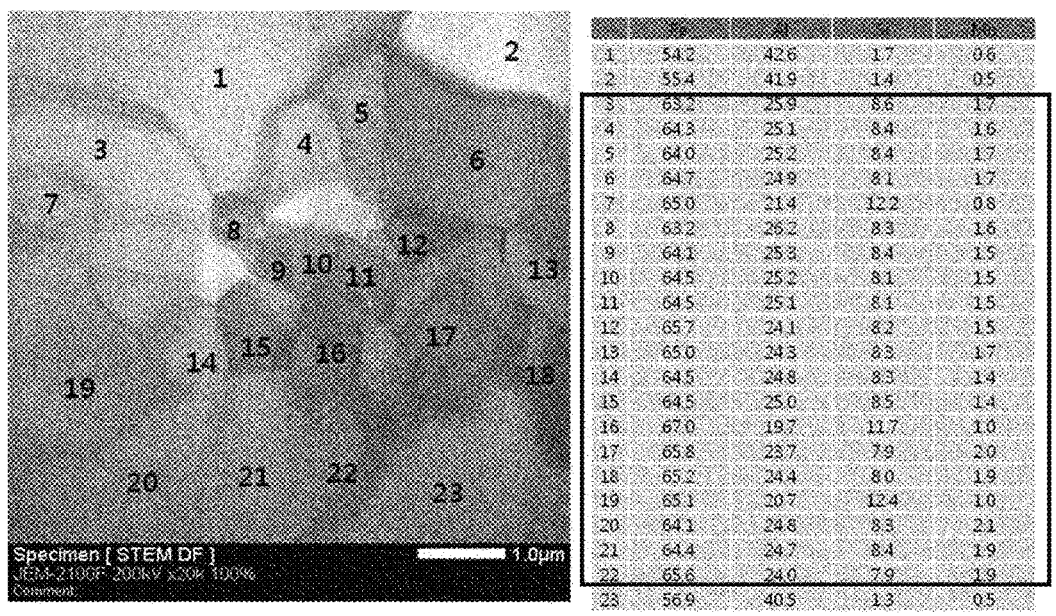
FIG. 3 is an image obtained by observing a middle layer portion in the plating layer in FIG. 2.

FIG. 2 is an image obtained by observing a hot press formed member sample of inventive example A-1, and FIG. 3 is an image obtained by observing the middle layer in FIG. 2 and the result obtained by analyzing the composition thereof. As indicated in FIG. 2, the middle layer occupied 5 to 30% in the overall Fe—Al alloy plated layer, and as indicated in FIG. 3, an average grain size of the middle layer was 2 μm or less, and a content of Si was 7 to 14 wt % (see a box region in the table in FIG. 3). Nos. 1, 2, and 23 in the table in FIG. 3 indicated that a phase of an outermost layer forming a boundary with the middle layer or a phase of an intermetallic compound layer was observed.

The invention claimed is:

1. An aluminum-based plated steel, comprising:
a base steel; and
an Al-based plated layer on the base steel,
wherein the Al-based plated layer comprises an Al—Si crystallized phase, and
wherein an average grain size of the Al—Si crystallized phase is 4 μm or less.

2. The aluminum-based plated steel of claim 1, wherein the base steel comprises, by wt %, 0.18 to 0.25% of C, 0.1 to 0.5% of Si, 0.9 to 1.5% of Mn, 0.03% or less of P, 0.01% or less of S, 0.01 to 0.05% of Al, 0.01 to 0.5% of Cr, 0.01 to 0.05% of Ti, 0.001 to 0.005% of B, 0.009% or less of N, and a balance of Fe and inevitable impurities.

3. The aluminum-based plated steel of claim 2, wherein the base steel comprises one or more of Mo and W in a content of 0.001 to 0.5%.

4. The aluminum-based plated steel of claim 2, wherein the base steel comprises one or more of Nb, Zr, and V in a content of 0.001 to 0.4%.

5. The aluminum-based plated steel of claim 2, wherein the base material comprises one or more of Cu and Ni in 0.005 to 2.0%.

6. The aluminum-based plated steel of claim 2, wherein the base steel comprises one or more of Sb, Sn, and Bi in 0.03% or less.

7. The aluminum-based plated steel of claim 1, wherein a content of Si of the Al—Si crystallized phase is 3 to 25 wt %.

8. The aluminum-based plated steel of claim 1, wherein an aspect ratio of the Al—Si crystallized phase is 10 or lower.

* * * * *